USO10268065B2

(12) United States Patent
Baek et al.

(10) Patent No.: US 10,268,065 B2
(45) Date of Patent: Apr. 23, 2019

(54) DISPLAY APPARATUS

(71) Applicant: SAMSUNG ELECTRONICS CO., LTD., Suwon-si (KR)

(72) Inventors: Do Hyeon Baek, Hwaseong-si (KR); Sung Je Woo, Hwaseong-si (KR); Hyun Jun Jung, Yongin-si (KR); Jong Hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/871,201

(22) Filed: Jan. 15, 2018

(65) Prior Publication Data

US 2018/0210279 A1 Jul. 26, 2018

(30) Foreign Application Priority Data

Jan. 25, 2017 (KR) .......................... 10-2017-0011798

(51) Int. Cl.
*G02F 1/1333* (2006.01)
*G02F 1/1335* (2006.01)
(Continued)

(52) U.S. Cl.
CPC ..... *G02F 1/133512* (2013.01); *G02B 6/0033* (2013.01); *G02F 1/1343* (2013.01);
(Continued)

(58) Field of Classification Search
CPC ......... G02F 1/133308; G02F 1/133305; G02F 1/1335; G02F 1/133512; G02F 1/133524;
(Continued)

(56) References Cited

U.S. PATENT DOCUMENTS

2007/0091640 A1    4/2007  Kim et al.
2010/0289994 A1*  11/2010  Nonaka ............. G02F 1/133514
                                                     349/108
(Continued)

FOREIGN PATENT DOCUMENTS

JP    200082314 A    3/2000
JP   2001357714 A   12/2001
(Continued)

OTHER PUBLICATIONS

International Search Report (PCT/ISA/210) dated May 17, 2018 by the International Searching Authority in counterpart International Patent Application No. PCT/KR2018/000720.

*Primary Examiner* — Thoi V Duong
(74) *Attorney, Agent, or Firm* — Sughrue Mion, PLLC

(57) ABSTRACT

A display apparatus includes: a display panel including a rounded corner and a black matrix formed in an edge portion of the display panel and configured to prevent patterns formed in the edge portion from being exposed externally to the display panel; a light guide plate configured to guide light to the display panel; light sources configured to radiate the light to the light guide plate; and a middle mold having a shape corresponding to the display panel, and configured to support the display panel and the light guide plate to be apart from each other, wherein the black matrix includes a first rounded corner portion having a first width greater than widths of other portions of the black matrix, and the middle mold includes a display panel support configured to support the display panel and including a second rounded corner portion having a second width greater than widths of other portions of the display panel support.

20 Claims, 21 Drawing Sheets

(51) Int. Cl.
*F21V 8/00* (2006.01)
*G02F 1/1343* (2006.01)

(52) U.S. Cl.
CPC ...... *G02F 1/133602* (2013.01); *G02B 6/0021* (2013.01); *G02B 6/0068* (2013.01); *G02B 6/0086* (2013.01); *G02B 6/0091* (2013.01); *G02F 2001/133302* (2013.01)

(58) Field of Classification Search
CPC ............ G02F 1/1333; G02F 1/133606; G02F 1/133504; G02F 1/1336; G02F 1/133602; G02F 1/133608; G02F 1/133615; G02F 2001/13332; G02F 2001/133314; G02F 2001/133331; G02F 2001/133317; G02F 2201/56
See application file for complete search history.

(56) References Cited

U.S. PATENT DOCUMENTS

| | | |
|---|---|---|
| 2011/0157914 A1 | 6/2011 | Chang |
| 2011/0199558 A1 | 8/2011 | Hamada |
| 2013/0039093 A1 | 2/2013 | Song et al. |
| 2015/0168770 A1 | 6/2015 | Kim |

FOREIGN PATENT DOCUMENTS

| | | |
|---|---|---|
| KR | 1020100010861 A | 2/2010 |
| KR | 10-2012-0064524 A | 6/2012 |

\* cited by examiner

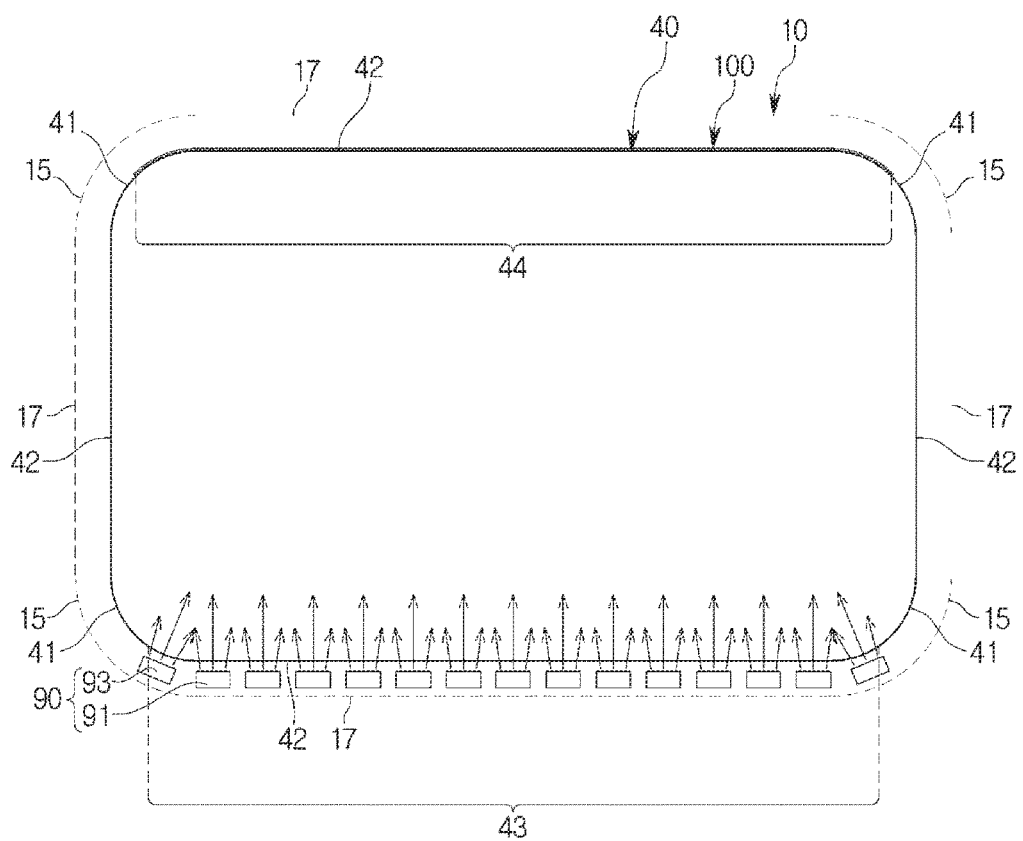

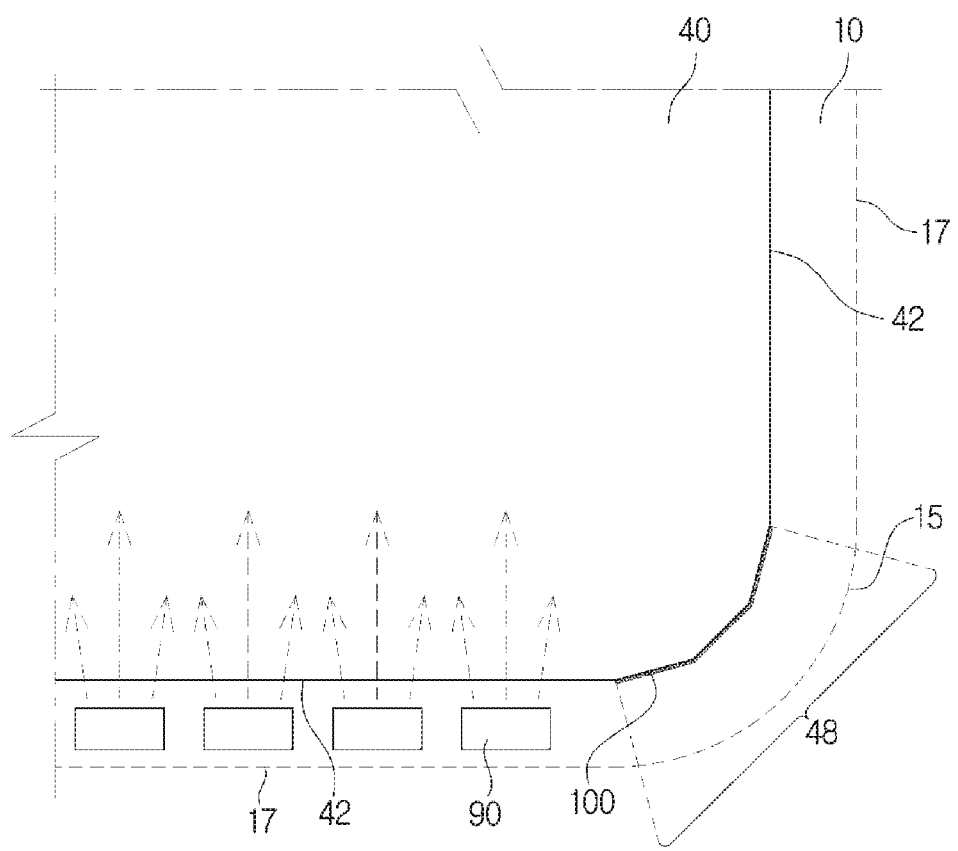

DISPLAY APPARATUS

CROSS-REFERENCE TO RELATED APPLICATION

This application claims priority from Korean Patent Application No. 10-2017-0011798, filed on Jan. 25, 2017 in the Korean Intellectual Property Office, the disclosure of which is incorporated herein by reference in its entirety.

BACKGROUND

1. Field

Apparatuses consistent with example embodiments relate to a display apparatus having a display panel provided with a corner having a rounded shape.

2. Description of the Related Art

A display apparatus, such as a television (TV), a monitor, and/or the like, is an apparatus that is configured to display information via a screen.

For example, a display apparatus may include a display apparatus using cathode ray tubes, a display apparatus using light emitting diodes, a display apparatus using organic light emitting diodes, a display apparatus using active-matrix organic light emitting diodes, a liquid crystal display, an electronic paper display apparatus, and/or the like.

Generally, a display panel displays an image by receiving light from light sources that are disposed behind the display panel. In some cases, light sources are arranged in an edge portion of a light guide plate and are configured to radiate light. As such, light radiated to the light guide plate by the light sources is guided to the display panel by the light guide plate. Additionally, a display apparatus may include a rectangular display panel and, as such, the exterior of the display apparatus typically has a rectangular shape.

However, display apparatuses have been developed to include display panels having rounded corners to improve aesthetics and the appearance of the display apparatuses. Because light guide plates are commonly rectangular, thicknesses of rounded corners of display panels may need to increase. The thickness of a rounded corner may negatively affect aesthetics and appearances of display apparatuses.

SUMMARY

One or more example embodiments provide a display apparatus having a slim corner portion in the overall appearance by improving a corner shape of a light guide plate that is disposed behind a display panel having a rounded corner.

According to an aspect of an example embodiment, there is provided display apparatus including: a display panel including a rounded corner and a black matrix that is formed in an edge portion of the display panel and is configured to prevent patterns formed in the edge portion from being exposed externally to the display panel; a light guide plate that is configured to guide light to the display panel; a plurality of light sources that is configured to radiate the light to the light guide plate; and a middle mold that has a shape corresponding to the display panel, and is configured to support the display panel and the light guide plate to be apart from each other, wherein the black matrix includes a first rounded corner portion having a first width that is greater than widths of other portions of the black matrix, and wherein the middle mold includes a display panel support that is configured to support the display panel and includes a second rounded corner portion having a second width that is greater than widths of other portions of the display panel support.

The light guide plate may include flat surface portions and a connecting portion that is disposed between the flat surface portions and connects the flat surface portions, and the connecting portion is provided at a position that corresponds to the rounded corner of the display panel.

The connecting portion has a rounded shape, an inclined shape, or a stepped shape.

The plurality of light sources may be disposed along a first portion of the light guide plate, and the display apparatus may further include a reflective tape that is attached to a second portion of the light guide plate and is configured to prevent the light, radiated by the plurality of light sources, from being output externally from the light guide plate through the second portion of the light plate.

The first portion may include a flat surface portion from among the flat surface portions, and the second portion may include a part of the connecting portion that extends from the flat surface portion, and light sources from among the plurality of light sources may be disposed at equal intervals along the first portion.

The plurality of light sources may include first light sources disposed at equal intervals along the flat surface portion, and second light sources disposed at equal intervals along the connecting portion of the light guide plate.

The first light sources may be driven independently of the second light sources.

The first portion may include a flat surface portion from among the flat surface portions, and the second portion may include another flat surface portion from among the flat surface portions, and a part of the connecting portion that extends from opposite end portions of the flat surface portion and the other flat surface portion.

The plurality of light sources may be disposed at equal intervals along the first portion.

According to an aspect of another example embodiment, there is provided a display apparatus including: a display panel including a rounded corner and a black matrix that is formed in an edge portion of the display panel and is configured to prevent patterns formed in the edge portion from being exposed externally to the display panel; a light guide plate that is configured to guide light to the display panel and includes flat surface portions and a connecting portion that is disposed between the flat surface portions and connects the flat surface portions, wherein the connecting portion is provided at a position corresponding to the rounded corner of the display panel; a middle mold that has a shape corresponding to the display panel and is configured to support the display panel and the light guide plate to be apart from each other; and a plurality of light sources that is configured to radiate the light to the light guide plate, wherein the black matrix includes a first rounded corner portion having a first width that is greater than widths of other portions of the black matrix, and wherein the middle mold includes a display panel support that is configured to support the display panel and includes a second rounded corner portion having a second width that is greater than widths of other portions of the display panel support.

The connecting portion may have a rounded shape, an inclined shape, or a stepped shape.

The connecting portion may include four connecting portions respectively provided in four corners of the light guide plate, and the flat surface portions are disposed between the four connecting portions.

The plurality of light sources may be disposed at equal intervals along a flat surface portion from among the flat surface portions.

The plurality of light sources may be disposed at equal intervals along the flat surface portions, and parts of the four connecting portions.

The plurality of light sources may be disposed at equal intervals along two flat surface portions, from among the flat surface portions, that are oppositely disposed.

The plurality of light sources may be disposed at equal intervals along two flat surface portions, from among the flat surface portions, that are oppositely disposed and along parts of the four connecting portions that extend from opposite end portions of the two flat surface portions.

The plurality of light sources may be disposed at equal intervals along a flat surface portion from among the flat surface portions.

The display apparatus may further include a reflective tape that is configured to prevent the light, radiated by the plurality of light sources, from being output externally to the light guide plate, and is attached to another flat surface portion, from among the flat surface portions, in a position facing the flat surface portion, and to a part of a connecting portion, from among the four connecting portions, and extends from an end portion of the other flat surface portion in a position facing the flat surface portion.

The plurality of light sources may be disposed at equal intervals along a flat surface portion from among the flat surface portions, and along a part of a connecting portion, from among the four connecting portions, that extends from an end portion of the flat surface portion.

The display apparatus may further include a reflective tape that is configured to prevent the light, radiated by the plurality of light sources, from being output externally from the light guide plate, and is attached to another flat surface portion, from among the plurality of flat surface portions, in a position facing the flat surface portion, and to a part of the connecting portion that extends from the end portion of the flat surface portion in a position facing the flat surface portion.

BRIEF DESCRIPTION OF THE DRAWINGS

The above and/or other aspects will become apparent and more readily appreciated from the following description of example embodiments, taken in conjunction with the accompanying drawings of which:

FIG. 6 is a view of light sources formed along a second flat surface portion and parts of second rounded portions in a lower edge portion of the light guide plate in accordance with an example embodiment;

FIG. 19 is a view of the light sources that are disposed along a second flat surface portion and a reflective tape that is attached to the inclined portion in accordance with an example embodiment.

DETAILED DESCRIPTION

Figure 1:
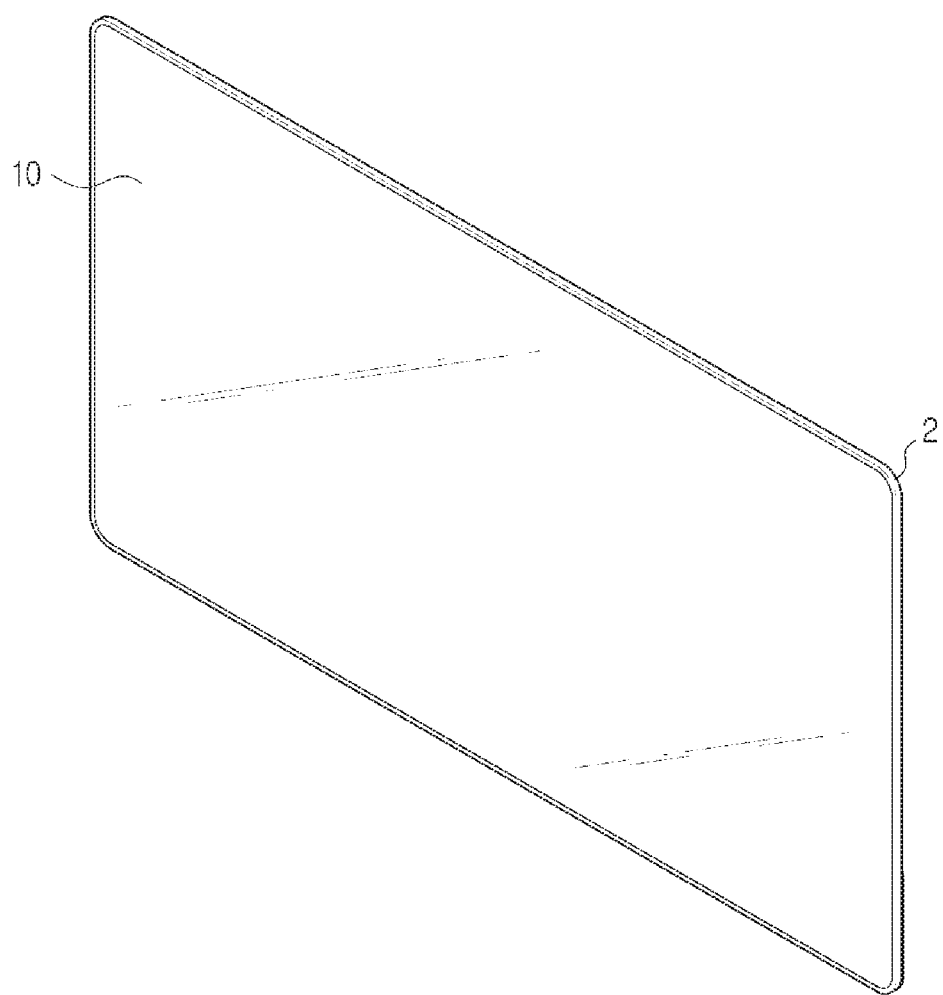
FIG. 1 is a perspective view of a display apparatus in accordance with an example embodiment.

Embodiments described herein and shown in the drawings are merely examples that may be modified in various different ways.

In addition, the same reference numerals or signs shown in the drawings indicate elements or components that may perform substantially the same function.

Also, the terms used herein are used to describe example embodiments and are not intended to limit or restrict the present disclosure. The singular forms of terms designated by "a," "an," and "the" are intended to include the plural forms of the terms as well, unless the context clearly indicates otherwise. In the present disclosure, the terms "including," "having," and/or the like, are used to specify features, numbers, steps, operations, elements, components, and/or combinations thereof, but do not preclude the presence or addition of one or more of the features, elements, steps, operations, elements, components, and/or combinations thereof.

It should be understood that the terms "first," "second," "third," etc. may be used herein to describe various elements, but the various elements are not limited by these terms. These terms may be used to distinguish an element from another element. Additionally, a first element may be termed as a second element, and a second element may be termed as a first element. The term "and/or" includes a plurality of combinations of relevant items or any particular item among a plurality of relevant items.

In the following detailed description, the terms "front surface," "rear surface," "upper portion," "lower portion," "left side," "right side," and/or the like, may be defined by the drawings, but the shape and the location of components described by the terms should not be limited by the terms.

Example embodiments will be described in more detail below with reference to the accompanying drawings.

A flat display apparatus is described as an example embodiment of the present disclosure, but is not limited thereto. For example, a display apparatus may include a curved display apparatus, a bendable or flexible display apparatus configured to transition between a curved state and a flat state, and/or the like.

The present disclosure may be applied to all types of display apparatuses regardless of screen size.

As an example, the present disclosure may be applied to a product installed on a table, a wall, a ceiling, and/or the like (e.g., a smart television, a monitor, and/or the like), a portable product (e.g., a tablet, a laptop, a smart phone, an e-book, and/or the like), and/or the like.

Figure 2:
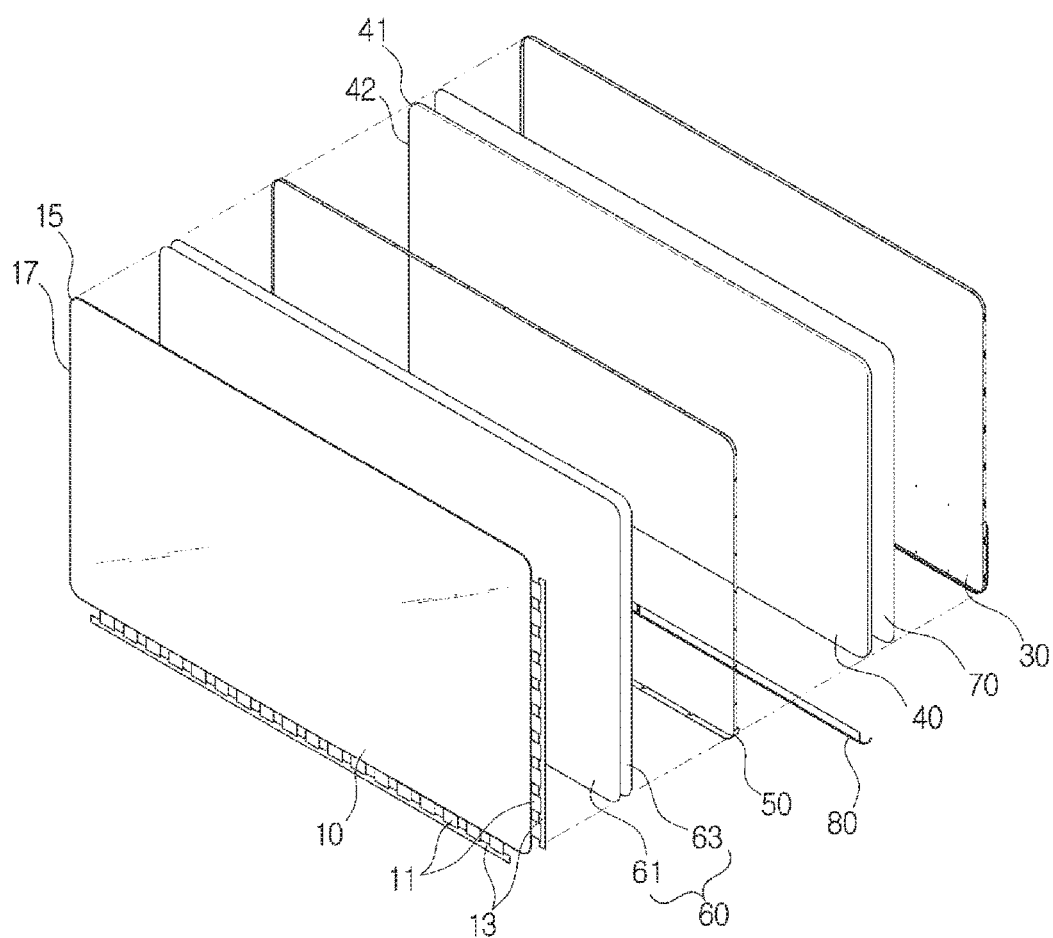
FIG. 2 is a perspective view of the display apparatus in accordance with an example embodiment.
Figure 3:
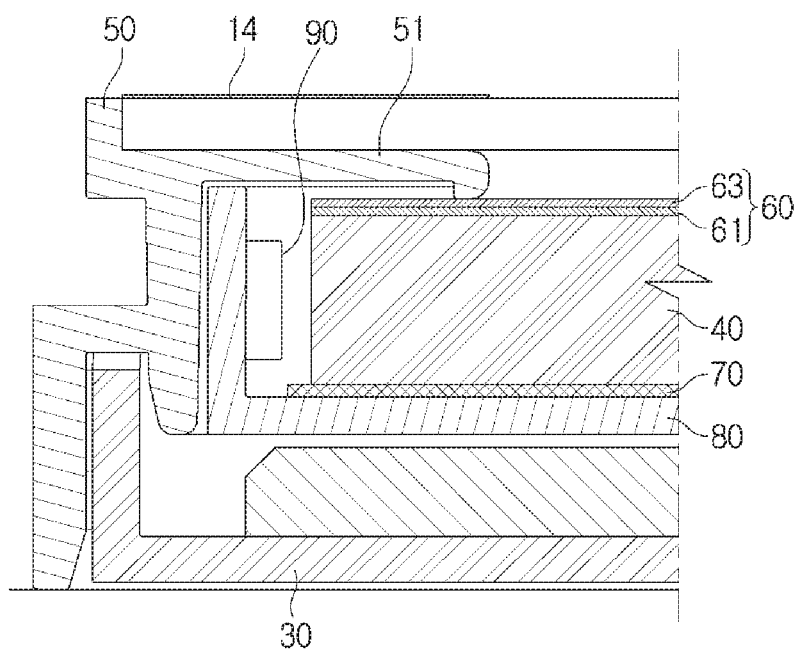
FIG. 3 is a cross-sectional view of the display apparatus and a flat surface portion of a display panel in accordance with an example embodiment.

As shown in FIGS. 1, 2 and 3, a display apparatus includes a corner portion 2 having a rounded shape. The display apparatus may include a display panel 10 on which information is displayed, and a bottom chassis 30 that is disposed behind the display panel 10 and coupled to a middle mold 50. Additionally, the display apparatus may include a light guide plate 40 that is disposed behind the display panel 10 to guide light, that is radiated by light sources 90, to the display panel 10.

Additionally, the display apparatus may include the middle mold 50 that is disposed in front of the bottom chassis 30 and configured to support the display panel 10 and the light guide plate 40, and to separate the display panel 10 and the light guide plate 40, and an optical sheet 60 that is disposed between the display panel 10 and the light guide plate 40 and permits improvement of optical characteristics of light that is guided to the display panel 10 by the light guide plate 40.

The display apparatus may also include a reflective sheet 70 that is disposed behind the light guide plate 40 and configured to reflect light that is radiated to a front surface of light guide plate 40 through a rear surface of the light guide plate 40, and a light source module 80 and a light source 90 that are configured to radiate light to the light guide plate 40.

The display panel 10 may be formed with a liquid crystal display panel by using liquid crystal, and the display panel 10 may include a thin film transistor (TFT) substrate on which a TFT is formed, a color filter substrate configured to face the TFT substrate, and liquid crystal provided between the TFT substrate and the color filter substrate.

The TFT substrate is a transparent glass substrate on which a TFT corresponding to a switching element is formed in a matrix form.

In the TFT, a data line is connected to a source terminal, a gate line is connected to a gate terminal, and a pixel electrode formed of a transparent conductive material is connected to a drain terminal.

The color filter substrate is disposed opposite to and spaced apart from the TFT substrate by a predetermined distance. Color pixels (e.g., red, green, and blue (RGB) pixels) that are configured to be expressed in a particular color when light is passed through the pixels are formed by a thin film process on the color filter substrate.

A common electrode formed of a transparent conductive material is formed on the front surface of the color filter substrate.

In situations where power is applied to the gate terminal of the TFT, an electric field is generated between the pixel electrode and the common electrode thereby changing an arrangement of the liquid crystal that is disposed between the TFT substrate and the color filter substrate.

The display panel 10 may generate an image by adjusting the arrangement of the liquid crystal. However, the display panel 10 might not be capable of radiating light. Therefore, the display panel 10 may display an image by receiving light from the light source module 80 and the light source 90 that are disposed behind the display panel 10.

A driving printed circuit board 11 that is configured to supply a drive signal to the display panel 10 may be disposed in a lower portion and a side surface of the display panel 10, and the display panel 10 and the driving printed circuit board 11 may be electrically connected by flexible printed circuit films 13 in which a drive chip is embedded.

The display panel 10 may include an active area in which an image is displayed, and an inactive area in which an image is not displayed.

The inactive area may include a certain width in an edge portion of the display panel 10, and the active area may include an area other than the inactive area that forms the edge portion.

A driving electrode pattern may be formed in the inactive area to drive the display panel 10 so that an image is displayed in the active area, and the driving electrode pattern may be electrically connected to the driving printed circuit board 11 by the flexible printed circuit films 13 so as to receive data and power from the driving printed circuit board 11.

A black matrix 14 may be formed in the inactive area to prevent the driving electrode pattern, that is formed in the inactive area of the display panel 10, from being exposed externally to the display panel 10.

The black matrix 14 may be formed such that a printed film, having a printed front surface and/or a printed rear surface, is attached to the inactive area of the display panel 10. Alternatively, the black matrix 14 may be formed such that a film that is processed to be black is attached to the inactive area.

Alternatively, the black matrix 14 may be formed by any other method configured to conceal the driving electrode pattern that is formed in the display panel 10.

As shown in the drawings, the display panel 10 is supported by the middle mold 50 and the middle mold 50 forms a front edge portion of the display apparatus. Alternatively, a top chassis may be disposed in the front surface of the display panel 10 to form a front edge portion, or an additional bezel that is configured to cover a top chassis may be provided to form the front edge portion of the display apparatus.

The bottom chassis 30 may be disposed behind the display panel 10 to form the rear surface of the display apparatus. Alternatively, a cover member that is configured to form an exterior of the rear surface of the display apparatus may be provided behind the bottom chassis 30.

The middle mold 50 may be disposed in front of the bottom chassis 30 and may be coupled to the bottom chassis 30. Additionally, the middle mold 50 may be configured to support the display panel 10 and the light guide plate 40, and to separate the display panel 10 and the light guide plate 40. Additionally, the middle mold 50 may include a display panel support 51 that is configured to support the display panel 10.

The display panel support 51 may have a width that corresponds to a width of the black matrix 14 that is formed in the edge portion of the display panel 10.

The optical sheet 60 may be provided between the display panel 10 and the light guide plate 40 to improve optical characteristics of light that is guided to the display panel 10 by the light guide plate 40. The optical sheet 60 may include a diffusion sheet 61 that is configured to improve brightness uniformity by diffusing light that is guided by the light guide plate 40, a light collecting sheet 63 that is configured to adjust a directionality of light to cause light, that is diffused by the diffusion sheet 61, to be guided vertically incident to the display panel 10, and a protection sheet that is configured to protect the light collecting sheet 63.

As shown in FIGS. 2 and 3, the optical sheet 60 is attached to the front side of the light guide plate 40, but embodiments are not limited thereto. Alternatively, the optical sheet 60 may be attached to the rear side of the display panel 10.

The light source module 80 and the light source 90 are disposed on the rear side of the display panel 10 and are configured to supply light to the display panel 10.

The light source module 80 includes a printed circuit board on which a conductive pattern is formed and light sources 90 that are embedded in the printed circuit board.

The light sources 90 may be provided as light emitting diodes (LEDs).

The display apparatus includes a rectangular display panel 10 and thus the display apparatus typically has a rectangular shape. However, display apparatuses have been developed in which display panels 10 have rounded corners in order to improve the aesthetics and the appearance of the display apparatuses.

According to an example embodiment, the display apparatus is formed such that the display panel 10 has a rounded corner (or rounded corners), and other components forming the display apparatus have rounded corners to correspond to the shape of the display panel 10.

Figure 15:
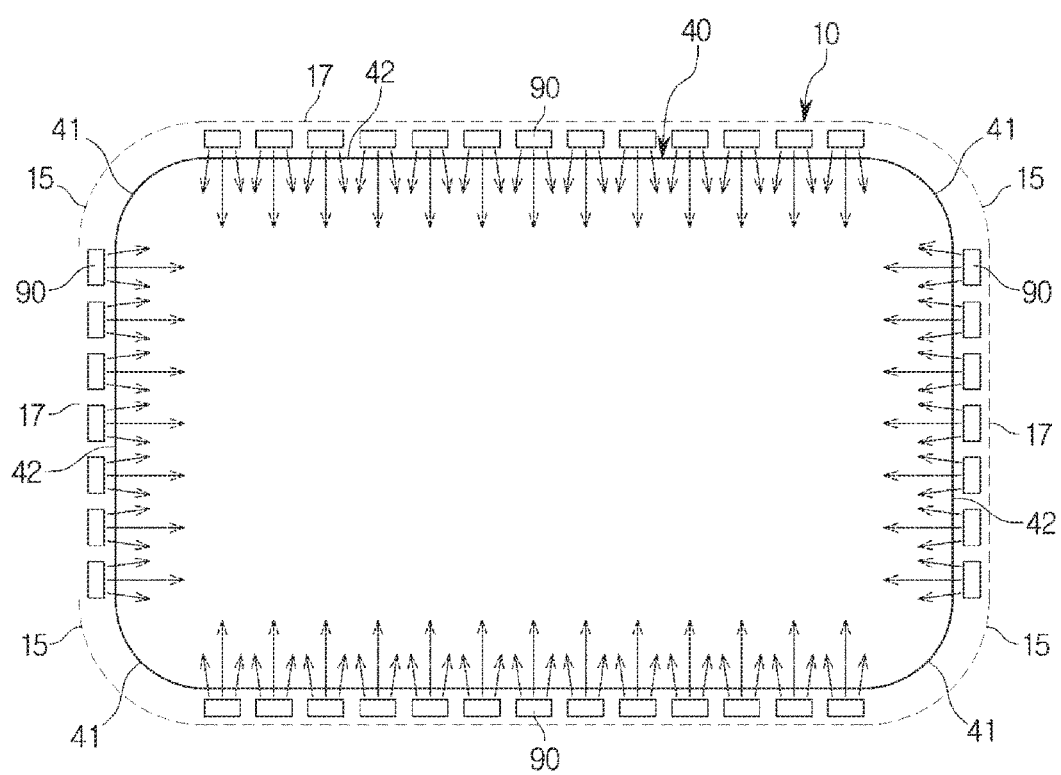
FIG. 15 is a view of light sources formed along each of the second flat surface portions of the light guide plate in accordance with an example embodiment.
Figure 16:
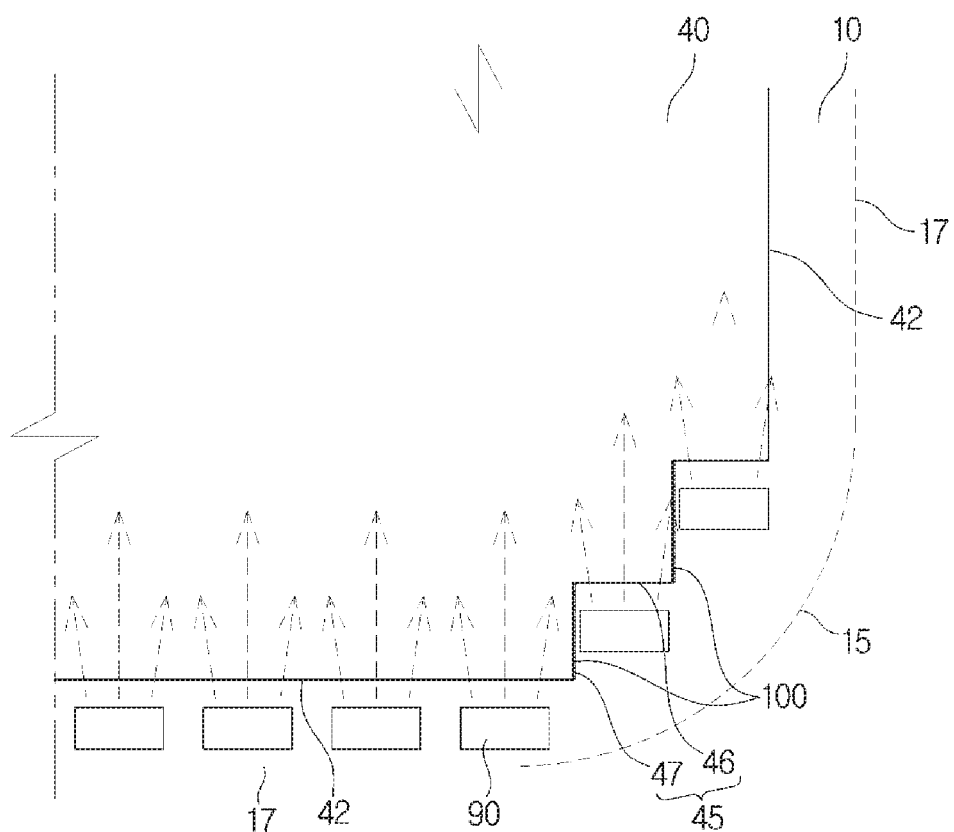
FIG. 16 is a view of a stepped portion having a stepped shape that is provided as the corner of the light guide plate, light sources that are provided along a second flat surface portion and the stepped portion, and a reflective tape that is attached on a surface in the stepped portion, which is perpendicular to the second flat surface portion along which the light sources are disposed, in accordance with an example embodiment.
Figure 17:
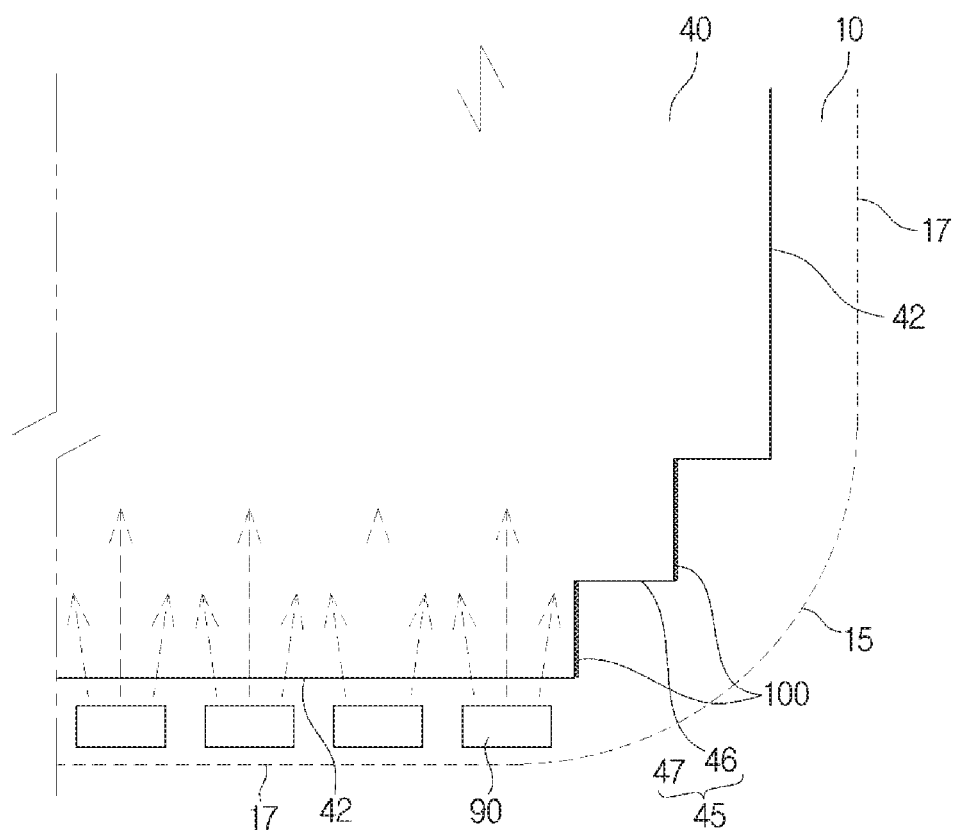
FIG. 17 is a view of the light sources that are disposed solely along the second flat surface portion in accordance with an example embodiment.
Figure 18:
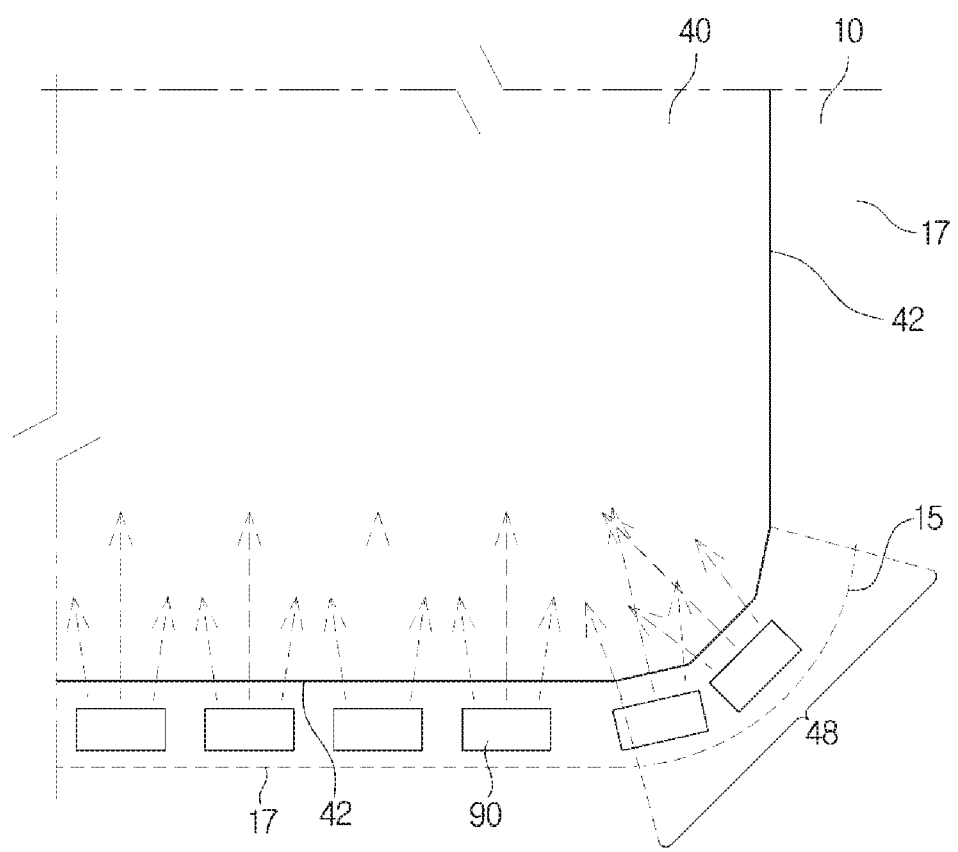
FIG. 18 is a view of an inclined portion having an inclined shape that is provided as the corner of the light guide plate, and light sources that are provided along a second flat surface portion and the inclined portion in accordance with an example embodiment.

The light guide plate 40 may include a connecting portion that may be provided in a position corresponding to a rounded corner of the display panel 10. The connecting portion may be provided as a rounded portion 41 having a rounded shape (e.g., as shown in FIGS. 6 through 15), an inclined portion 48 having an inclined shape (e.g., as shown in FIGS. 18 and 19), or a stepped portion 45 having a stepped shape (e.g., as shown in FIGS. 16 and 17).

As such, the display panel 10 and other components that form the display apparatus, such as the bottom chassis 30, the light guide plate 40, the middle mold 50, the optical sheet 60, and/or the reflective sheet 70, may include rounded portions having substantially rounded shapes.

Although the drawings show the corner of the bottom chassis 30, the light guide plate 40, the middle mold 50, the optical sheet 60, and the reflective sheet 70 as having rounded portions having rounded shapes, the corner of the optical sheet 60 and the reflective sheet 70 may include another shape as compared to the rounded shape.

The above mentioned components may include four corners that each have a rounded portion, and may include flat surface portions that are provided between the rounded portions.

Hereinafter, for convenience of description, the rounded portions 15 and the flat surface portions 17 provided in the display panel 10 are referred to as first rounded portions and first flat surface portions. Further, the rounded portions 41 and the flat surface portions 42 provided in the light guide plate 40 are referred to as second rounded portions and second flat surface portions.

As shown in FIG. 3, the display panel support 51, of the middle mold 50, that supports the display panel 10 may have a width that corresponds to a width of the black matrix 14 formed in the display panel 10.

In situations where a corner of the display panel 10 is provided with the rounded portion 15 having the rounded shape, an area, in which the driving electrode pattern is formed in the display panel 10, may be formed to correspond to the shape of the display panel 10. Therefore, the black matrix 14, that covers the area in which the driving electrode pattern is formed, may be formed to have a shape that corresponds to the shape of the display panel 10.

The area, of the display panel 10 in which the driving electrode pattern is formed, may be formed to have a constant width that corresponds to the shape of the display panel 10. Therefore, the black matrix 14, that covers the area in which the driving electrode pattern is formed, may be formed to have a constant width that corresponds to the shape of the display panel 10.

However, in situations where the corner of the display panel 10 is provided with the rounded portion 15 having the rounded shape, an area of the rounded portion 15 may be relatively smaller than an area of a corner of the display panel 10 having a rectangular shape. As such, a space in which the driving electrode pattern is formed becomes insufficient.

Figure 5A:
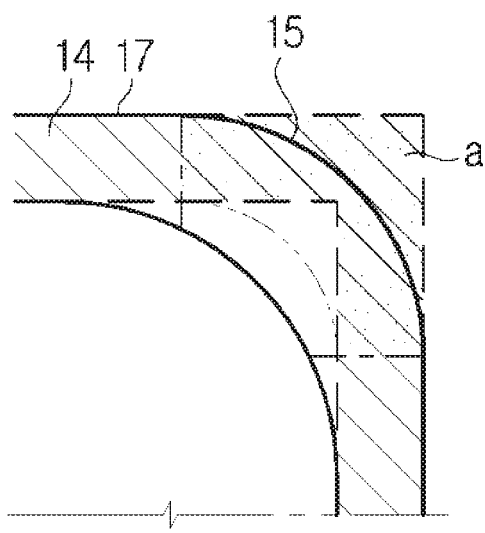
FIGS. 5A, 5B, and 5C are views of a black matrix formed in the display panel in accordance with example embodiments.

As shown in FIG. 5A, in situations where the display panel 10 is formed in a rectangular shape, the area in which the driving electrode pattern is formed may have a constant width and thus the black matrix 14 may have a constant width.

Figure 5B:
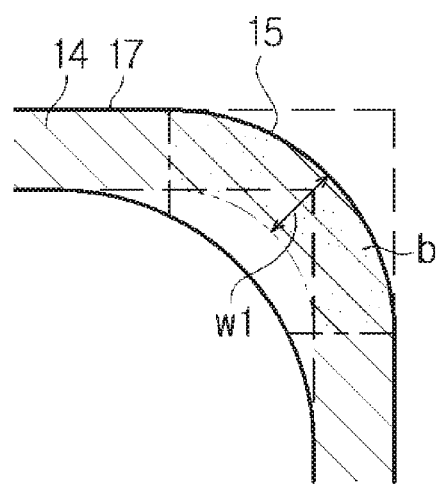

However, as further shown in FIG. 5B, in situations where the corner of the display panel 10 is provided with the rounded portion 15 and the black matrix 14 has a constant width, an area b of the black matrix 14, that is formed in the rounded portion 15 and that corresponds to the corner of the display panel 10, may be smaller than an area a of the black matrix 14 that is formed in the corner of the display panel 10 and that is provided to have the rectangular shape as shown in FIG. 5A.

Therefore, in a situation where the corner of the display panel 10 is provided with the rounded portion 15, and the black matrix 14 has a constant width, it may be difficult for the black matrix 14 to cover the entire area in which the driving electrode pattern is formed in the rounded portion 15.

Figure 5C:
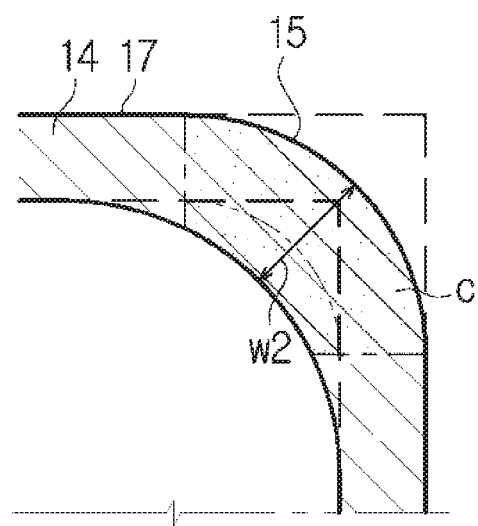

To permit the black matrix 14 to cover the entire area where the driving electrode pattern is formed in the rounded portion 15 such as in situations where the corner of the display panel 10 is provided as the rounded portion 15, a width w2 of the black matrix 14 in the rounded portion 15 may be increased to an area c of the black matrix 14 as further shown in FIG. 5C.

Figure 4:
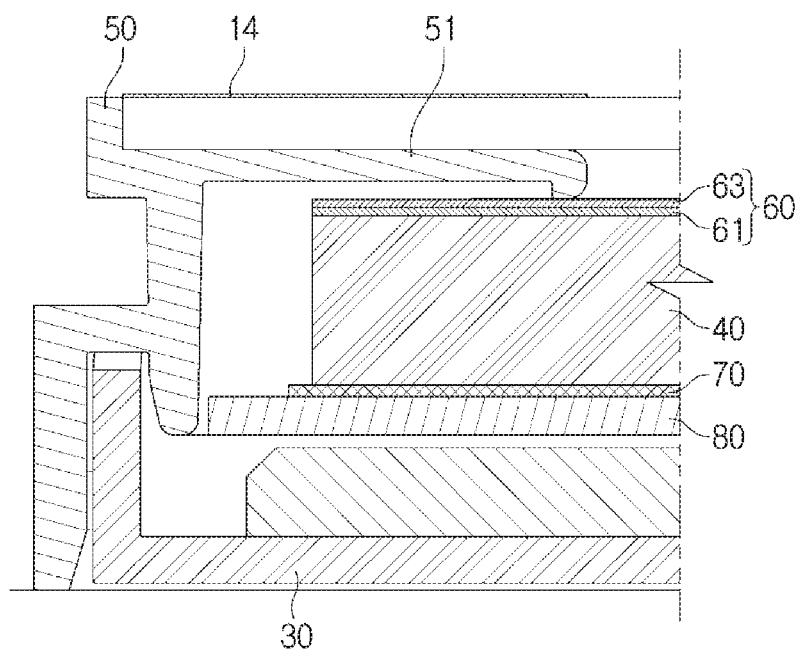
FIG. 4 is a cross-sectional view of the display apparatus and a rounded portion of the display panel in accordance with an example embodiment.

As compared to situations where a width w1 of the black matrix 14 is constant, as illustrated in FIG. 5B, the width w2 of the black matrix 14 may be larger in the rounded portion 15 as shown in FIG. 5C. Additionally, the area c of the black matrix 14 may be increased. As such, thus although the corner of the display panel 10 is provided with the rounded portion 15 having the rounded shape, the black matrix 14 may cover the entire area in which the driving electrode pattern is formed. As further shown in FIG. 5C, because a width of the black matrix 14 formed in the rounded portion 15 is larger than as compared to other portions of the black matrix 14, the display panel support 51 of the middle mold 50 may have a width that is greater than a width of the display panel support 51 as shown in FIG. 3. In this way, as shown in FIG. 4, the display panel support 51 may include a width that corresponds to the width of the black matrix 14. As shown in FIG. 2, the display panel 10 includes four first rounded portions 15, and four first flat surface portions 17 that are disposed between the first rounded portions 15. Additionally, the light guide plate 40 includes four second rounded portions 41, and four second flat surface portions 42 that are disposed between the second rounded portions 41.

While display panel 10 and the light guide plate 40 are depicted as having four first rounded portions 15 and four second rounded portions 41, other embodiments may include a different number of first rounded portions 15 and/or second rounded portions 41. Alternatively, the light guide plate 40 may be provided with a number of second rounded portions 41 that corresponds to the number of the first rounded portions 15 of the display panel 10.

As shown in FIG. 6, a first portion 43, that is an edge portion of the light guide plate 40, includes light sources 90 that are provided along the first portion 43 and that are configured to radiate light to the first portion 43 of the light guide plate 40.

The light sources 90 may be disposed at equal intervals along the first portion 43 of the light guide plate 40.

The first portion 43 is a lower edge portion of the light guide plate 40 with respect to the drawings, and the first portion 43 may include a second flat surface portion 42 of the lower edge portion of the light guide plate 40, and a part of the second rounded portions 41 that extend from opposite end portions of the second flat surface portion 42 of the lower edge portion of the light guide plate 40.

In situations where the light sources 90 are disposed along the entirety of the second rounded portions 41, light radiated through the second flat surface portions 42 of the lower edge portion is prevented from moving to the inside of the light guide plate 40 by light that is radiated through the second rounded portions 41. In contrast, in situations where the light sources 90 are disposed up to respective parts (e.g., less than an entirety) of the second rounded portions 41 that extend from opposite end portions of the second flat surface portion 42 of the lower edge portion, light radiated through the second flat surface portion 42 of the lower edge portion might not be prevented from moving to the inside of the light guide plate 40.

Therefore, because the light sources 90 are disposed up to the respective parts of the second rounded portions 41, the light radiated through the second flat surface portion 42 of the lower edge portion may move to the inside of the light guide plate 40 without substantial interruption.

When light is radiated to the first portion 43 that corresponds to the lower edge portion of the light guide plate 40, the light may be output externally to light guide plate 40 through an upper edge portion of the light guide plate 40 which is an edge that faces the first portion 43, thereby reducing an amount of light that is radiated to the display panel 10 disposed in front of the light guide plate 40.

A reflective tape 100, that is configured to prevent light from being output externally through the upper edge portion of the light guide plate 40, may be attached to a second portion 44 of the light guide plate 40 that corresponds to the upper edge portion of the light guide plate 40 and that faces the first portion 43.

The second portion 44 of the light guide plate 40, to which the reflective tape 100 is attached, may include a second flat surface portion 42 at the upper edge portion that faces the first portion 43, and respective parts of the second rounded portions 41 that extend from opposite end portions of the second flat surface portion 42 of the light guide plate 40.

When light is radiated to the first portion 43 of the light guide plate 40 by the light sources 90, light that moves straight in an emission direction may be reflected by the reflective tape 100 that is attached to the second portion 44 of the light guide plate 40, and thus the light may be prevented from being output externally to the light guide plate 40 through the second portion 44. Instead, the light may be output via the front surface of the light guide plate 40 and thereby radiated to the display panel 10.

The light sources 90 that are configured to radiate light to the first portion 43 of the light guide plate 40 may include a first set 91 of light sources 90 that is disposed at equal intervals along the second flat surface portion 42 in the first portion 43, and a second set 93 of light sources 90 that is disposed at equal intervals along respective parts of the second rounded portions 41.

The first set 91 of light sources 90 and the second set 93 of light sources 90 are independently driven, and as such, it may be possible to radiate light to the light guide plate 40 from the first set 91 of light sources 90, from the second set 93 of light sources 90, or from both of the first set 91 of light sources 90 and the second set 93 of light sources 90.

Figure 7:
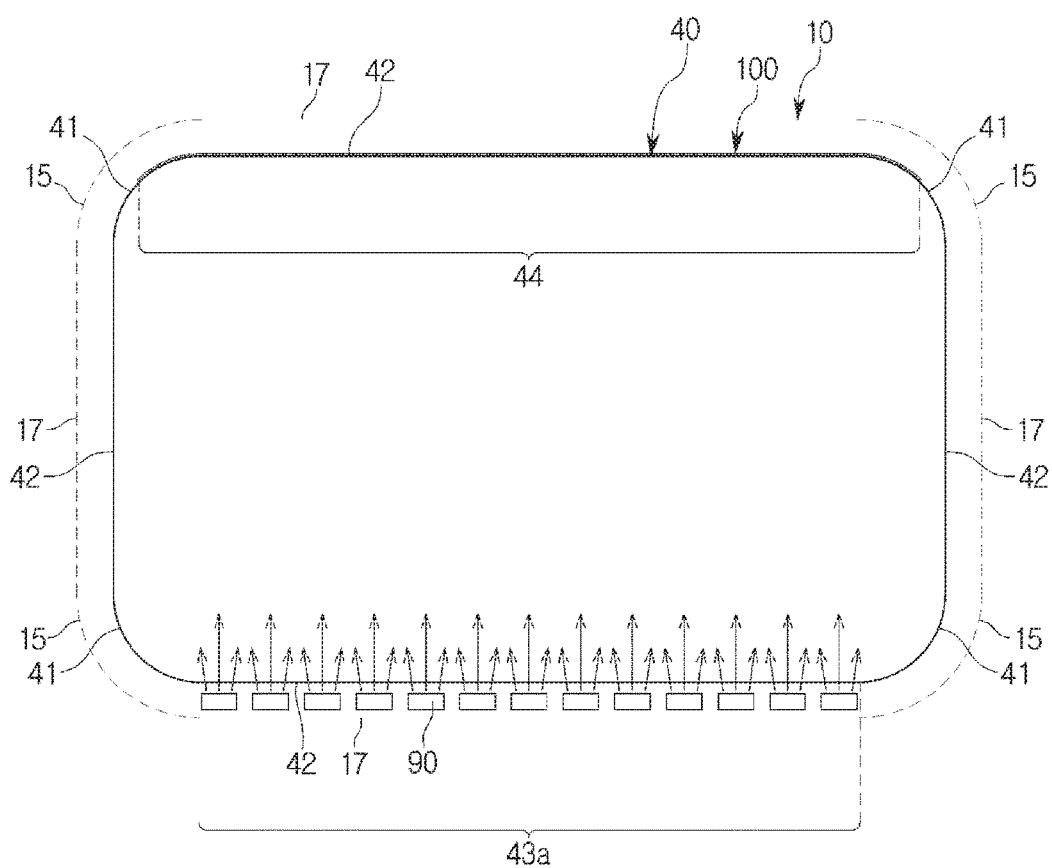
FIG. 7 is a view of light sources formed along the second flat surface portion in the lower edge portion of the light guide plate in accordance with an example embodiment.

As shown in FIG. 7, a first portion 43a of the light guide plate 40 in which the light sources 90 are disposed may be provided solely along the second flat surface portion 42 at the bottom edge of light guide plate 40, and the light sources 90 may be disposed at equal intervals along the second flat surface portion 42.

Some example embodiments herein depict the first portions 43 and 43a in which the light sources 90 are disposed as being disposed at the lower edge portion of the light guide plate 40, and the second portion 44 to which the reflective tape 100 is attached as being disposed at the upper edge portion of the light guide plate 40, but embodiments are not limited thereto. Alternatively, the first portions 43 and 43a may be disposed at the upper edge portion of the light guide plate 40, and the second portion 44 to which the reflective tape 100 is attached may be disposed at the lower edge portion of the light guide plate 40.

Figure 8:
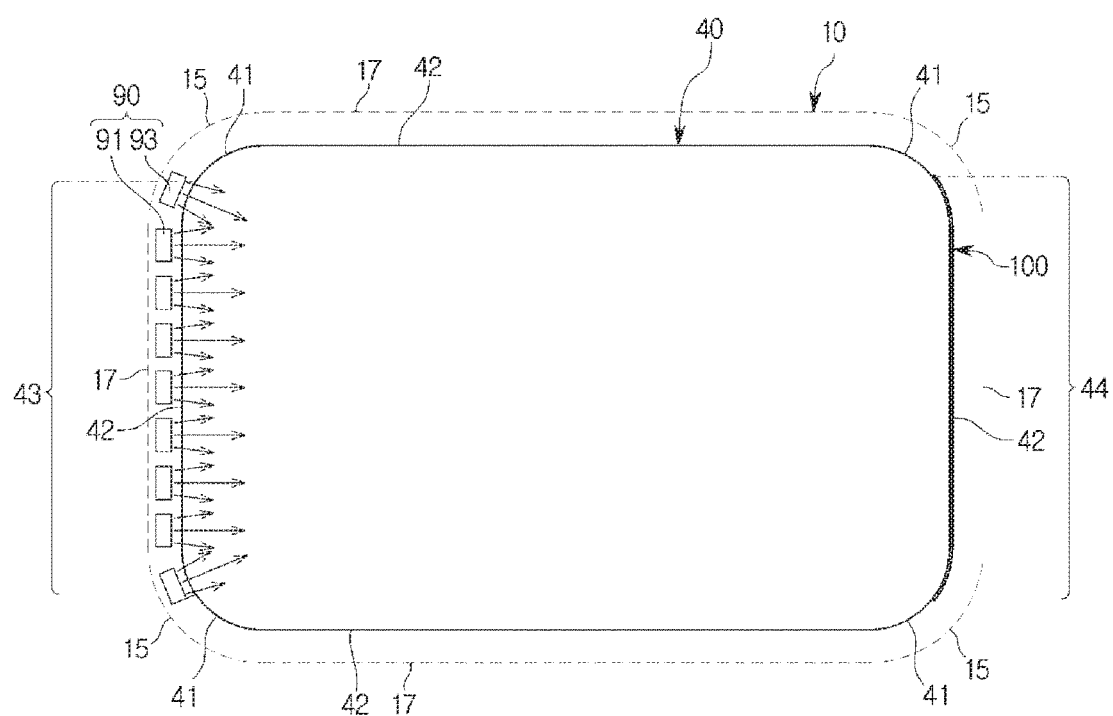
FIG. 8 is a view of light sources formed along a second flat surface portion and parts of second rounded portions in a left side edge portion of the light guide plate in accordance with an example embodiment.
Figure 9:
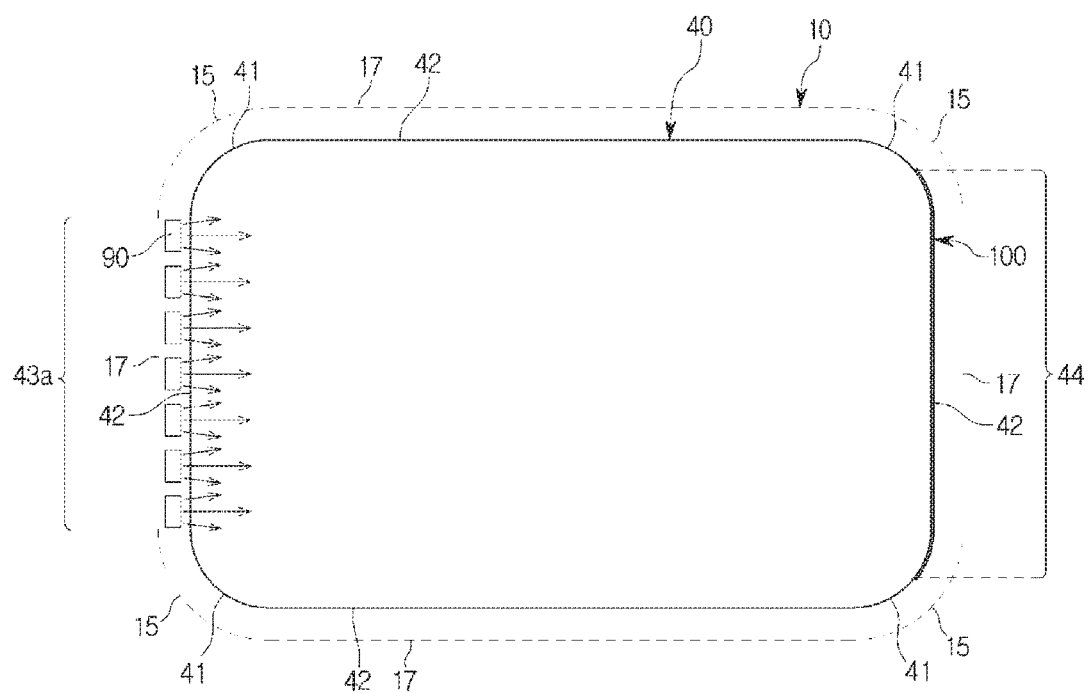
FIG. 9 is a view of light sources formed along the second flat surface portion in the left side edge portion of the light guide plate in accordance with an example embodiment.

As shown in FIGS. 8 and 9, the first portions 43 and 43a may be disposed at the left side edge portion of the light guide plate 40, and the second portion 44 may be disposed at the right side edge portion of the light guide plate 40 that faces the first portions 43 and 43a.

Some example embodiments depict the first portions 43 and 43a, in which the light sources 90 are disposed, as being disposed at the left side edge portion of the light guide plate 40, and the second portion 44, to which the reflective tape 100 is attached, as being disposed at the right side edge portion of the light guide plate 40. Alternatively, the first portions 43 and 43a may be disposed at the right side edge portion of the light guide plate 40, and the second portion 44, to which the reflective tape 100 is attached, may be disposed at the left side edge portion of the light guide plate 40.

Figure 10:
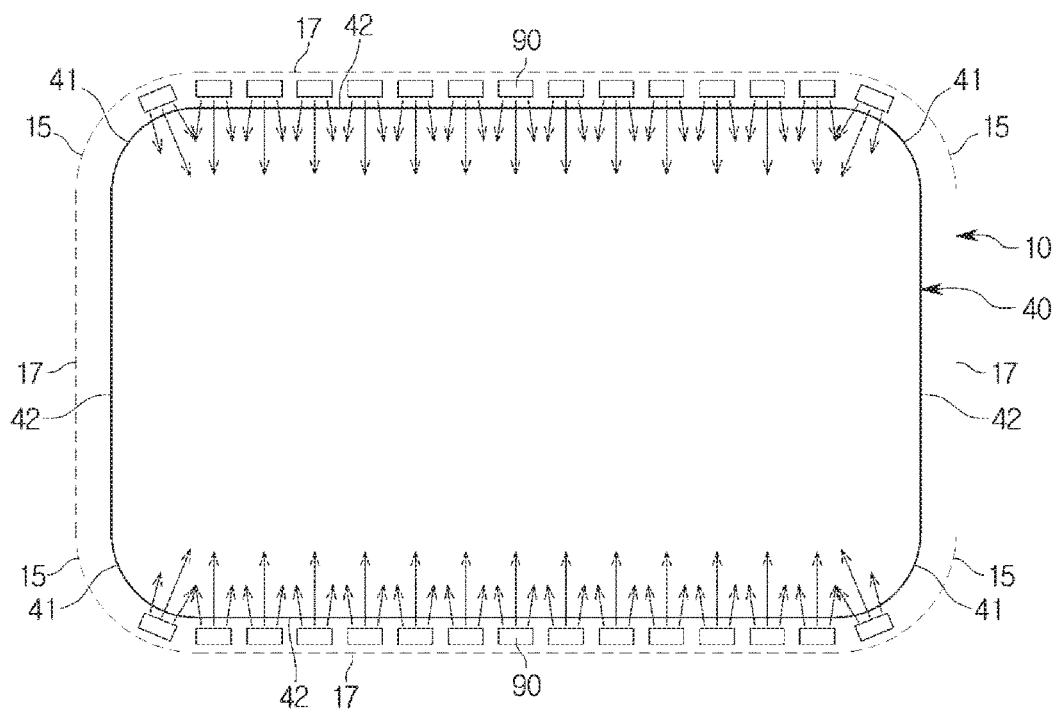
FIG. 10 is a view of light sources formed along second flat surface portions and parts of second rounded portions in the upper and lower edge portions of the light guide plate in accordance with an example embodiment.

As shown in FIG. 10, and in association with the upper and lower edge portions of the light guide plate 40, the light sources 90 may be disposed along the second flat surface portions 42 and respective parts of the second rounded portions 41 that extend from opposite end portions of the second flat surface portions 42, and the light sources 90 may be configured to radiate light to the light guide plate 40.

The light sources 90 may be disposed at equal intervals along the second flat surface portions 42 and the second rounded portions 41 that extend from opposite end portions of the second flat surface portions 42.

Because the light sources 90 are disposed in both of the upper and lower edge portions of the light guide plate 40 and radiate light to the light guide plate 40, the radiated light may be not output externally to light guide plate 40 through the upper and lower edge portions of the light guide plate 40. As such, the reflective tape 100 might not be attached to the light guide plate 40 (i.e., might not be required).

The light sources 90, that are disposed along the second flat surface portions 42, may be driven independently of the light sources 90 that are disposed along the respective parts of the second rounded portions 41.

Figure 11:
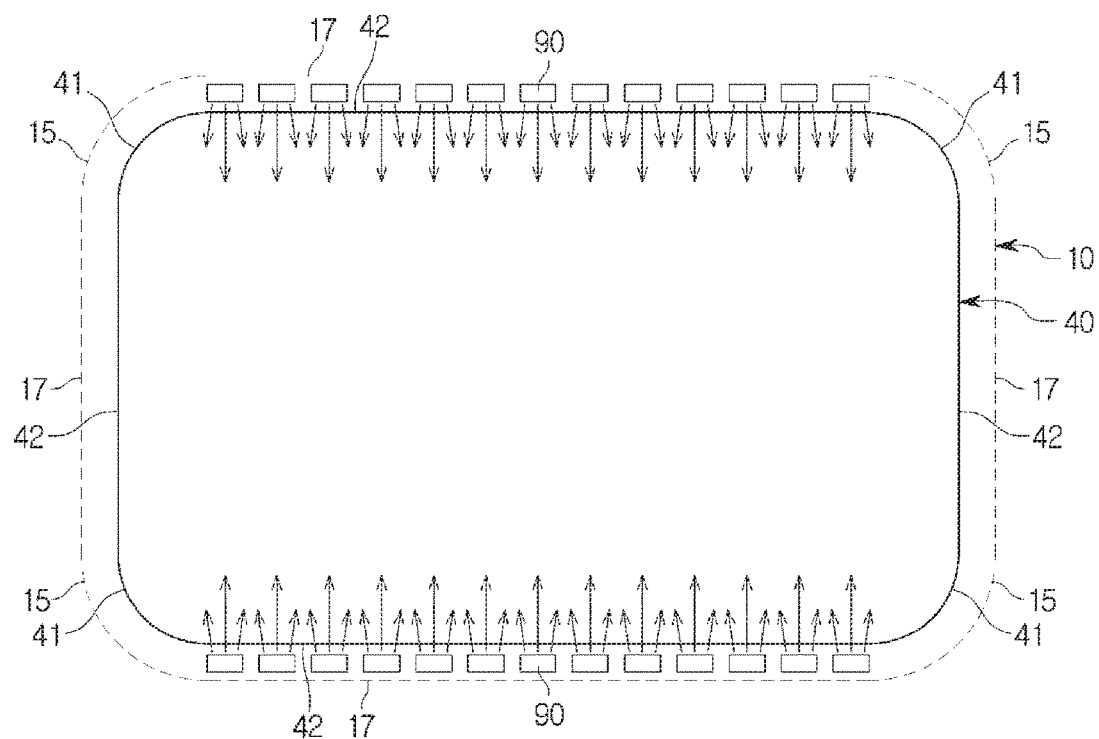
FIG. 11 is a view of light sources formed along respective second flat surface portions in the upper and lower edge portions of the light guide plate in accordance with an example embodiment.

As shown in FIG. 11, and in association with the upper and lower edge portions of the light guide plate 40, the light sources 90 may be disposed along the second flat surface portions 42, and may be configured to radiate light to the light guide plate 40.

The light sources 90 may be disposed at equal intervals along the second flat surface portions 42.

Figure 12:
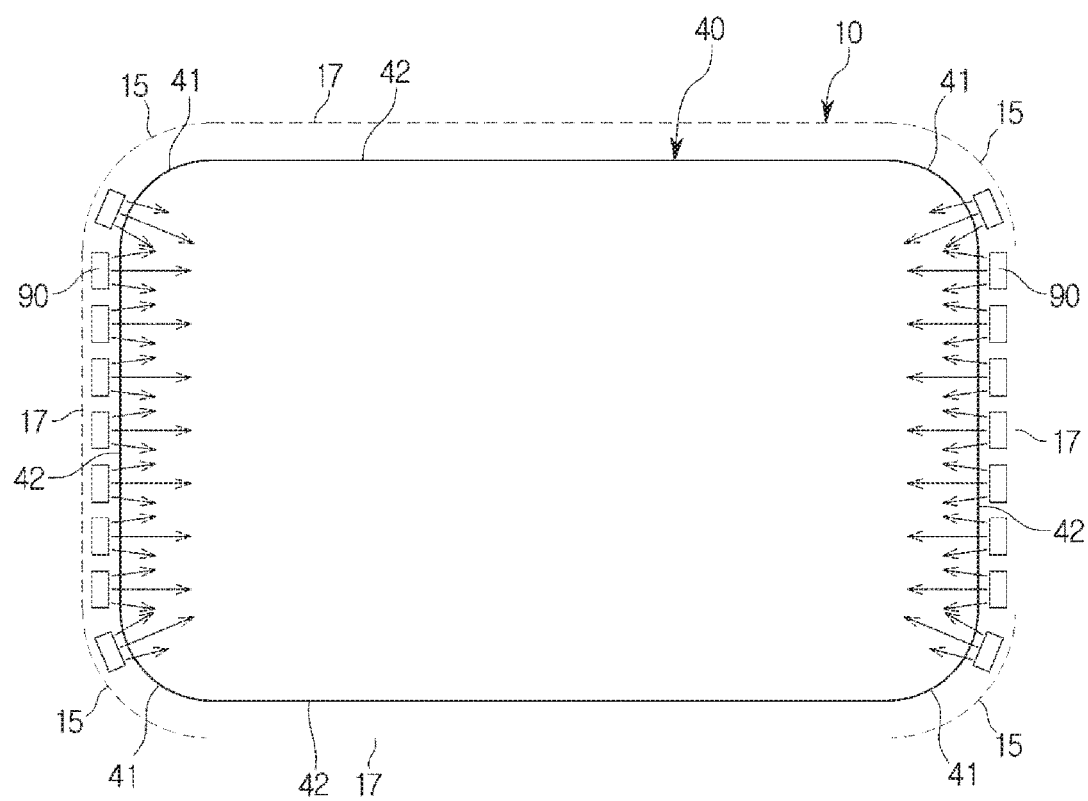
FIG. 12 is a view of light sources formed along respective second flat surface portions and respective parts of second rounded portions in the left and right side edge portion of the light guide plate in accordance with an example embodiment.

As shown in FIG. 12, and in association with the left and right side edge portions of the light guide plate 40, the light sources 90 may be disposed along the second flat surface portions 42, and along the respective parts of the second rounded portions 41 that extend from opposite end portions of the second flat surface portions 42, and may be configured to radiate light to the light guide plate 40.

The light sources 90 may be disposed at equal intervals along the second flat surface portions 42 and the second rounded portions 41 that extend from opposite end portions of the second flat surface portions 42.

Because the light sources 90 are disposed in both of the left and right side edge portions of the light guide plate 40 and radiate light to the light guide plate 40, the radiated light may be not output externally through the left and right side edge portions of the light guide plate 40. As such, the reflective tape 100 is attached to the light guide plate 40 might not be attached to the light guide plate 40 (e.g., might not be required).

The light sources 90 that are disposed along second flat surface portions 42 may be driven independently of the light sources 90 that are disposed along the second rounded portion 41.

Figure 13:
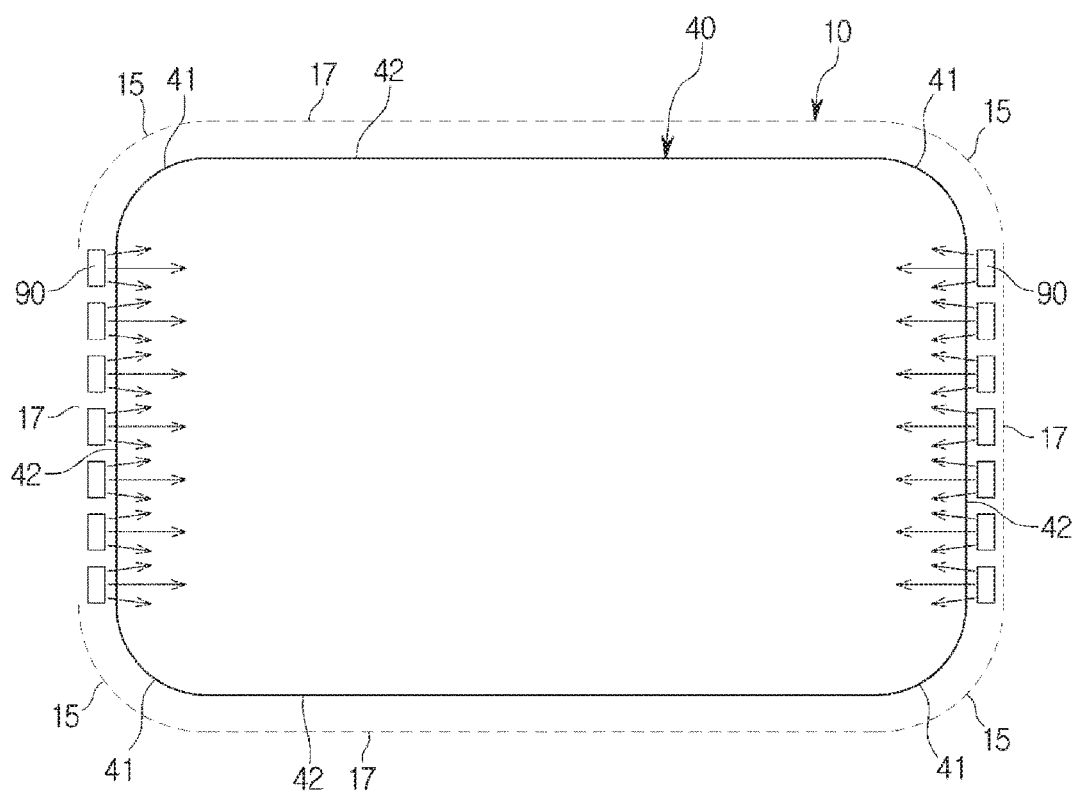
FIG. 13 is a view of light sources formed along the respective second flat surface portions in the left and right edge portion of the light guide plate in accordance with an example embodiment.

As shown in FIG. 13, in the left and right side edge portions of the light guide plate 40, the light sources 90 may be disposed along the second flat surface portions 42, and may be configured to radiate light to the light guide plate 40. The light sources 90 may be disposed at equal intervals along the second flat surface portions 42.

Figure 14:
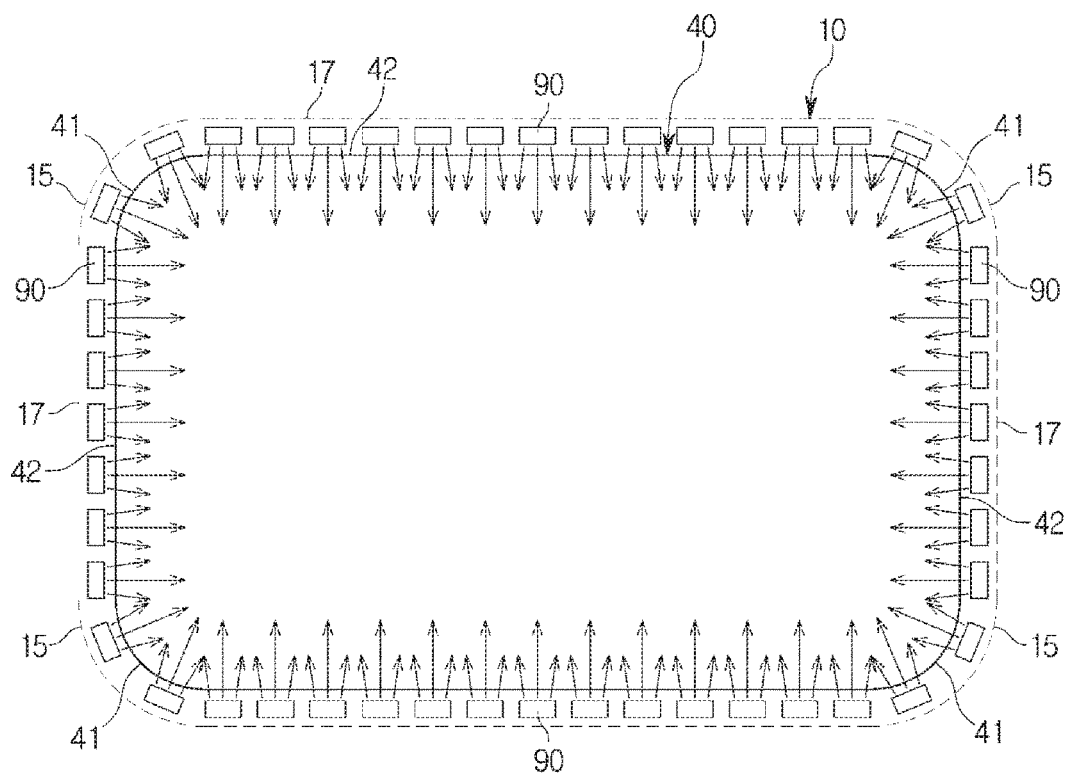
FIG. 14 is a view of light sources formed along each second flat surface portion and parts of each second rounded portion of the light guide plate in accordance with an example embodiment.

As shown in FIG. 14, in each edge portion of the light guide plate 40, the light sources 90 may be disposed along each second flat surface portion 42 and parts of each second rounded portion 41 that extend from opposite end portions of the second flat surface portions 42, and may be configured to radiate light to the light guide plate 40.

The light sources 90 may be disposed at equal intervals along the second flat surface portions 42 and the parts of the second rounded portions 41 that extend from opposite end portions of the second flat surface portions 42.

Because the light sources 90 are disposed along the entire edge portion of the light guide plate 40 to radiate light to the light guide plate 40, the radiated light might not be output externally to the light guide plate 40 through any of the edge portions of the light guide plate 40, and, as such, the reflective tape 100 might not be attached to the light guide plate 40 (i.e., might not be required). The light sources 90 that are disposed along the second flat surface portions 42 may be driven independently of the light sources 90 that are disposed along the respective parts of the second rounded portions 41. As shown in FIG. 15, the light sources 90 may be disposed along each of the second flat surface portions 42, and may be configured to radiate light to the light guide plate 40. The light sources 90 may be disposed at equal intervals along the second flat surface portions 42.

As shown in FIG. 16, the corner of the light guide plate 40, that corresponds to the rounded portion 15 provided in the corner of the display panel 10, may be provided as a stepped portion 45 having a stepped shape.

Therefore, the entire light guide plate 40 may include four stepped portions 45, and four second flat surface portions 42 that are disposed between the stepped portions 45.

While the corner of the light guide plate 40 is provided as the stepped portion 45 having the stepped shape, light sources 90 may be provided along a single edge portion, both oppositely facing edge portions, or an entire edge portion of the light guide plate 40.

The light sources 90 may be disposed along the second flat surface portions 42 and the stepped portion 45.

The light sources 90 that are disposed in the stepped portion 45 may be disposed at a distance from a horizontal surface 46 to radiate light to the horizontal surface 46. The horizontal surface 46 may be parallel to the second flat surface portions 42, in which the light sources 90 are disposed, in the stepped portion 45.

A distance between the horizontal surface 46 and the light sources 90 may be equal to a distance between the light sources 90 and the second flat surface portions 42.

A reflective tape 100 may be attached to a vertical surface 47 that is perpendicular to the second flat surface portions 42, in which the light sources 90 are disposed, in the stepped portion 45. As such, light that is radiated to the second flat surface portions 42 by the light sources 90 that are disposed in the second flat surface portions 42 and radiated inside of the light guide plate 40, is not interrupted by light radiated by the light sources 90 that are disposed in the stepped portion 45.

The reflective tape 100 that is attached to the vertical surface 47 may be configured to prevent the light, that is radiated to the second flat surface portions 42 and radiated inside of the light guide plate 40, from being interrupted by the light radiated by the light sources 90 that are disposed in the stepped portion 45, the reflective tape 100 may be configured to improve a dark portion and a bright portion caused by the light that is radiated to the second flat surface portions 42.

Alternatively, the reflective tape 100 may not be attached to the vertical surface 47.

As shown in FIG. 17, the light sources 90 may be disposed solely along the second flat surface portions 42. Although the light sources 90 are disposed solely along the second flat surface portions 42, improvements to the dark portion and the bright portion caused by the light radiated to the second flat surface portions 42 may be possible because the reflective tape 100 is attached to the vertical surface 47 in the stepped portion 45.

As shown in FIG. 18, the corner of the light guide plate 40, that corresponds to the rounded portion 15 that is provided in the corner of the display panel 10, may be provided as an inclined portion 48 having an inclined shape.

Therefore, the light guide plate 40 may include four inclined portions 48, and four second flat surface portions 42 that are disposed between the inclined portions 48.

Although the corner of the light guide plate 40 is provided as the inclined portion 48 having the inclined shape, light sources 90 may be provided on a single edge portion, a pair of oppositely facing edge portions, or an entire edge portion of the light guide plate 40.

The light sources 90 may be disposed along the second flat surface portions 42 and the inclined portion 48.

The light sources 90 that are disposed in the inclined portion 48 may be disposed up to a part of the inclined portion 48 (e.g., less than an entirety of the inclined portion 48), that extends from the second flat surface portions 42 in which the light sources 90 are disposed, in the inclined portion 48.

In this way, light that is radiated through the second flat surface portions 42 may be prevented from radiating to the inside of the light guide plate 40 by light radiated through the inclined portion 48 in situations where the light sources 90 are disposed along an entirety of the inclined portion 48.

Therefore, because the light sources 90 are disposed up to a part of the inclined portion 48, light that is radiated through the second flat surface portions 42 may move to the inside of the light guide plate 40 without substantial interruption.

As shown in FIG. 19, the light sources 90 may be disposed solely along the second flat surface portions 42.

Although the light sources 90 are disposed solely along the second flat surface portions 42, improvement of the dark portion and the bright portion caused by the light radiated to the second flat surface portions 42 may be possible because the reflective tape 100 is attached to the inclined portion 48.

As described in association with an example embodiment, the corner of the light guide plate 40 has a rounded portion that corresponds to the shape of the display panel 10 having a rounded corner. Alternatively, the stepped portion or the inclined portion may be formed in the corner of the light guide plate 40 that corresponds to the corner of the display panel 10 having the rounded shape, and the light sources 90 are disposed to correspond to the shape of the corner of the light guide plate 40. Accordingly, it may be possible to implement a slim corner of the display apparatus provided with the display panel 10 having the rounded corner (or rounded corners).

As is apparent from the above description, some implementations herein permit the display apparatus to be provided with the corner having the rounded shape and the slim shape.

Although some example embodiments of the present disclosure have been shown and described herein, it should be appreciated by those skilled in the art that changes may be made to these example embodiments without departing from the principles and spirit of the present disclosure, the scope of which is defined in the claims and their equivalents.

What is claimed is:

1. A display apparatus comprising:
   a display panel comprising a rounded corner and a black matrix that is formed in an edge portion of the display panel and is configured to prevent patterns formed in the edge portion from being exposed externally to the display panel;
   a light guide plate that is configured to guide light to the display panel;
   a plurality of light sources that is configured to radiate the light to the light guide plate; and
   a middle mold that has a shape corresponding to the display panel, and is configured to support the display panel and the light guide plate to be apart from each other,
   wherein the black matrix comprises a first rounded corner portion having a first width that is greater than widths of other portions of the black matrix, and
   wherein the middle mold comprises a display panel support that is configured to support the display panel and comprises a second rounded corner portion having a second width that is greater than widths of other portions of the display panel support.

2. The display apparatus of claim 1, wherein the light guide plate comprises flat surface portions and a connecting portion that is disposed between the flat surface portions and connects the flat surface portions, and
   wherein the connecting portion is provided at a position that corresponds to the rounded corner of the display panel.

3. The display apparatus of claim 2, wherein the connecting portion has a rounded shape, an inclined shape, or a stepped shape.

4. The display apparatus of claim 2, wherein the plurality of light sources is disposed along a first portion of the light guide plate, and
   wherein the display apparatus further comprises a reflective tape that is attached to a second portion of the light guide plate and is configured to prevent the light, radiated by the plurality of light sources, from being output through the second portion of the light plate.

5. The display apparatus of claim 4, wherein the first portion comprises a flat surface portion from among the flat surface portions, and the second portion comprises a part of the connecting portion that extends from the flat surface portion, and
   wherein light sources from among the plurality of light sources are disposed at equal intervals along the first portion.

6. The display apparatus of claim 5, wherein the plurality of light sources comprises first light sources disposed at equal intervals along the flat surface portion, and second light sources disposed at equal intervals along the connecting portion of the light guide plate.

7. The display apparatus of claim 6, wherein the first light sources are driven independently of the second light sources.

8. The display apparatus of claim 4, wherein the first portion comprises a flat surface portion from among the flat surface portions, and
   wherein the second portion comprises another flat surface portion from among the flat surface portions, and a part of the connecting portion that extends from opposite end portions of the flat surface portion and the other flat surface portion.

9. The display apparatus of claim 8, wherein the plurality of light sources is disposed at equal intervals along the first portion.

10. A display apparatus comprising:
    a display panel comprising a rounded corner and a black matrix that is formed in an edge portion of the display panel and is configured to prevent patterns formed in the edge portion from being exposed externally to the display panel;

a light guide plate that is configured to guide light to the display panel and comprises flat surface portions and a connecting portion that is disposed between the flat surface portions and connects the flat surface portions, wherein the connecting portion is provided at a position corresponding to the rounded corner of the display panel;

a middle mold that has a shape corresponding to the display panel and is configured to support the display panel and the light guide plate to be apart from each other; and a plurality of light sources that is configured to radiate the light to the light guide plate, wherein the black matrix comprises a first rounded corner portion having a first width that is greater than widths of other portions of the black matrix, and wherein the middle mold comprises a display panel support that is configured to support the display panel and comprises a second rounded corner portion having a second width that is greater than widths of other portions of the display panel support.

11. The display apparatus of claim 10, wherein the connecting portion has a rounded shape, an inclined shape, or a stepped shape.

12. The display apparatus of claim 10, wherein the connecting portion comprises four connecting portions respectively provided in four corners of the light guide plate, and the flat surface portions are disposed between the four connecting portions.

13. The display apparatus of claim 12, wherein the plurality of light sources is disposed at equal intervals along a flat surface portion from among the flat surface portions.

14. The display apparatus of claim 12, wherein the plurality of light sources is disposed at equal intervals along the flat surface portions, and parts of the four connecting portions.

15. The display apparatus of claim 12, wherein the plurality of light sources is disposed at equal intervals along two flat surface portions, from among the flat surface portions, that are oppositely disposed.

16. The display apparatus of claim 12, wherein the plurality of light sources is disposed at equal intervals along two flat surface portions, from among the flat surface portions, that are oppositely disposed and along parts of the four connecting portions that extend from opposite end portions of the two flat surface portions.

17. The display apparatus of claim 12, wherein the plurality of light sources is disposed at equal intervals along a flat surface portion from among the flat surface portions.

18. The display apparatus of claim 17, further comprising a reflective tape that is configured to prevent the light, radiated by the plurality of light sources, from being output externally to the light guide plate, and is attached to another flat surface portion, from among the flat surface portions, in a position facing the flat surface portion, and to a part of a connecting portion, from among the four connecting portions, and extends from an end portion of the other flat surface portion in a position facing the flat surface portion.

19. The display apparatus of claim 12, wherein the plurality of light sources is disposed at equal intervals along a flat surface portion from among the flat surface portions, and along a part of a connecting portion, from among the four connecting portions, that extends from an end portion of the flat surface portion.

20. The display apparatus of claim 19, further comprising a reflective tape that is configured to prevent the light, radiated by the plurality of light sources, from being output externally from the light guide plate, and is attached to another flat surface portion, from among the plurality of flat surface portions, in a position facing the flat surface portion, and to a part of the connecting portion that extends from the end portion of the flat surface portion in a position facing the flat surface portion.

* * * * *